C. H. YOUNG.
DRIVING MECHANISM FOR VEHICLES.
APPLICATION FILED MAR. 21, 1921.
1,430,139.
Patented Sept. 26, 1922
2 SHEETS—SHEET 1.
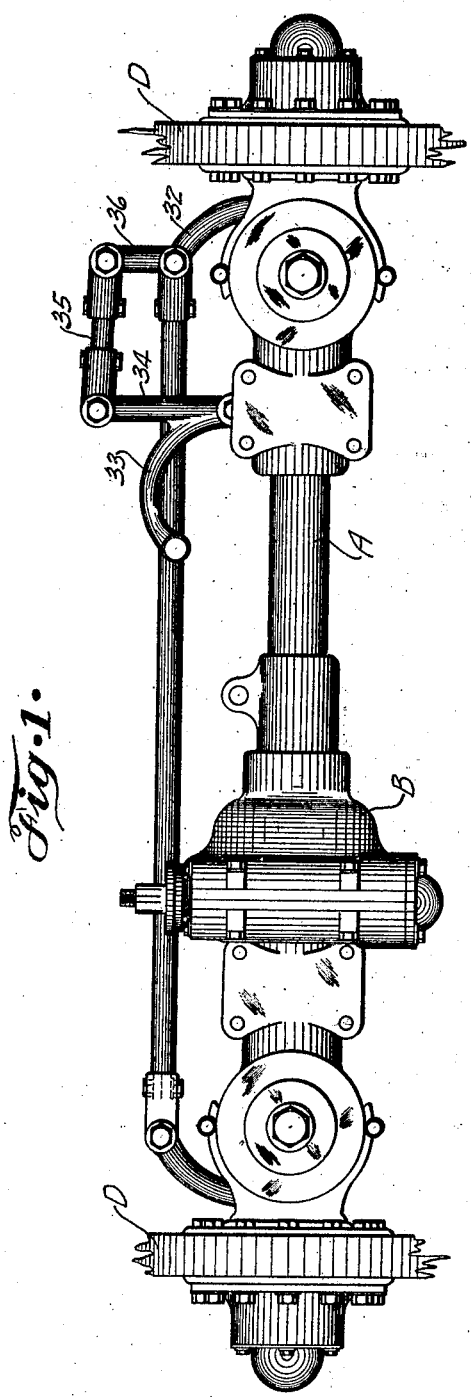
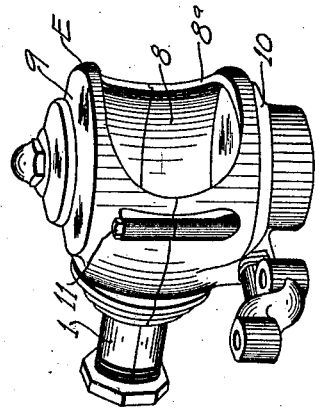
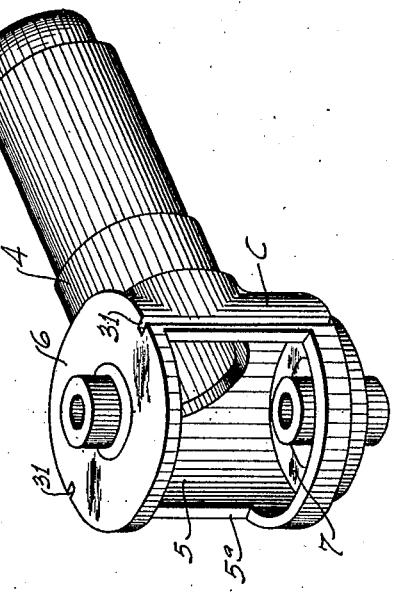
INVENTOR
Clifford H. Young.
BY
Bakewell & Church
ATTORNEYS

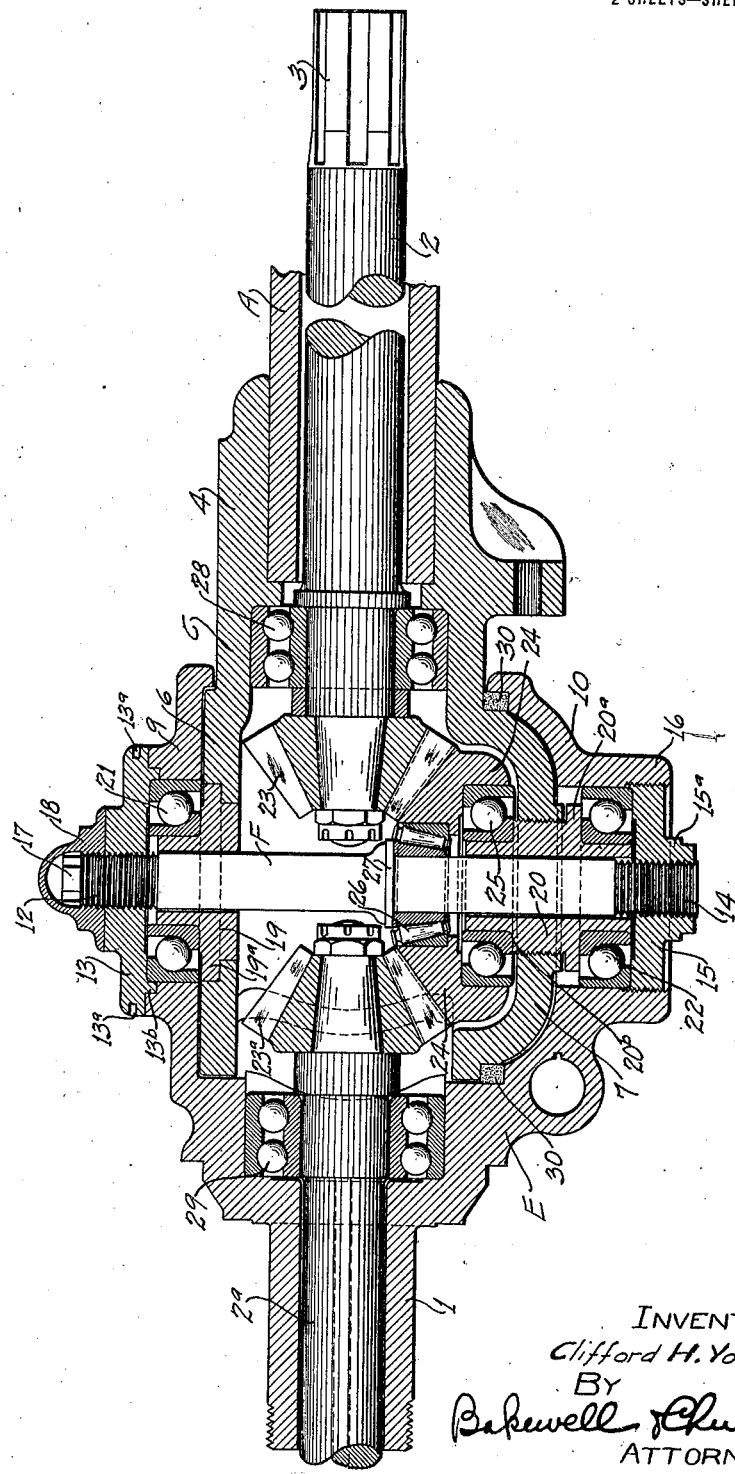

Patented Sept. 26, 1922.

1,430,139

UNITED STATES PATENT OFFICE.

CLIFFORD H. YOUNG, OF ST. LOUIS, MISSOURI.

DRIVING MECHANISM FOR VEHICLES.

Application filed March 21, 1921. Serial No. 454,125.

*To all whom it may concern:*

Be it known that I, CLIFFORD H. YOUNG, a citizen of the United States, residing at St. Louis, Missouri, have invented a certain new and useful Improvement in Driving Mechanisms for Vehicles, of which the following is a full, clear, and exact description, such as will enable others skilled in the art to which it appertains to make and use the same.

This invention relates to driving mechanism for automobiles and other vehicles of the type in which the power is applied directly to those wheels of the vehicle which are turned to guide or change the path of travel of the vehicle.

The main object of my invention is to provide an inexpensive driving mechanism of the character referred to that is rugged enough to successfully stand up under severe operating conditions and which is so constructed that the bearings and the other parts of same that are subjected to excessive wear can be adjusted easily to compensate for wear. Other objects and desirable features of my invention will be hereinafter pointed out.

Figure 1 of the drawings is a top plan view of a front wheel driving mechanism for vehicles constructed in accordance with my invention.

Figure 2 is a perspective view of one of the gear cases on the axle housing.

Figure 3 is a perspective view of one of the oscillating wheel carrying members; and Figure 4 is an enlarged vertical sectional view illustrating the details of construction of one of the gear cases and the oscillating wheel carrying member that is mounted on same.

Referring to the drawings which illustrate the preferred form of my invention, A designates the housing of the front axle of an automobile or other power operated vehicle which is equipped with a differential case B that houses a differential mechanism of any preferred construction that is arranged between the propeller shaft (not shown) and the drive shaft of my improved mechanism, said differential case being arranged at one side of the middle or center of the axle housing A, as shown in Figure 1. The axle housing A is provided at its opposite ends with gear cases C, and the front wheels D of the vehicle are rotatably mounted on axle extensions 1 on wheel carrying members E that oscillate on the gear cases C when the steering mechanism of the vehicle is actuated to turn the front wheels D, so as to change the path of travel of the vehicle. The drive shaft of the mechanism is of the floating type and comprises two intermediate sections 2 that are directly connected with the gears of the differential mechanism and two end sections 2ª that are connected by means of gears with said intermediate sections 2, as shown in Figure 4. The front wheels D of the vehicle are secured to the end sections 2ª of the drive shaft and the intermediate sections 2 of said drive shaft are provided at their inner ends with portions 3 that are adapted to be slipped into and out of the gears (not shown) of the differential mechanism. Each of the gear cases C consists of a rugged casting provided with a horizontally-disposed tubular portion 4 that projects laterally from the inner side of a hollow, vertically-disposed portion 5 provided with top and bottom walls 6 and 7, respectively, as shown in Figures 2 and 4, the wall 5 of said casting being provided with a slot or opening 5ª at a point in longitudinal alignment with the tubular portion 4 of the casting so as to permit the co-operating end section 2ª of the drive shaft to project into the gear case C, as shown in Figure 4. The wheel carrying member E that co-operates with said gear case also consists of a casting comprising a vertically-disposed portion 8 provided at its upper and lower ends with top and bottom walls 9 and 10, respectively, and having an opening or cut out portion 8ª in the inner side of same so as to provide a clearance for the tubular portion 4 on the gear case C, and thus permit the wheel carrying member E to turn or oscillate on said gear case, it being understood that the vertically-disposed, hollow portion 8 of the wheel carrying member E surrounds the portion 5 of the gear case C. The axle extension 1 of said wheel carrying member projects laterally from the hollow portion 8 of the casting at a point opposite the opening 8ª in said hollow portion, said axle extension being provided with any suitable type of friction reducing bearing for the wheel D to turn on. In the form of my invention herein shown each of the oscillating wheel carrying members E is divided longitudinally on a horizontal line so as to facilitate the assembling of the mechanism, the top and bottom parts of said wheel carrying member being connected together by bolts 11, as shown in Figure 3.

Each of the wheel carrying members E is connected to its co-operating gear case C by a vertically-disposed king pin F arranged in such a manner that the various bearings of the structure can be adjusted to compensate for wear. In the form of my invention herein illustrated the king pin F consists of a rugged bolt or one-piece spindle arranged vertically at the axis of rotation of the wheel carrying member E. Said king pin is provided at its upper end with a screw threaded portion 12 that is threaded into a thrust cap 13 which bears upon the top wall 9 of the wheel carrying member and said king pin is also provided at its lower end with a screw threaded portion 14 which is threaded into an adjustable member 15 that is screwed into a depending collar 16 on the underside of the wheel carrying member E, as shown in Figure 4, said member 15 having a non-circular-shaped portion 15ª that is adapted to be engaged by a wrench during the operation of screwing the member 15 into or out of the collar 16. The thrust cap 13 is provided in its peripheral edges with holes 13ª for receiving a spanner wrench and the king pin F is provided at its upper end with a non-circular-shaped portion 17 that is adapted to be engaged by a wrench during the operation of adjusting said king pin to compensate for wear on the bearings. Preferably, a cap nut 18 is mounted on the extreme upper end of the king pin to cover same and also serve as a lock nut to prevent relative movement of the king pin and thrust cap 13.

The king pin F passes freely through a sleeve 19 removably mounted in the top wall 6 of the gear case C and through a sleeve 20 that is adjustably mounted in the bottom wall 7 of said gear case. The sleeve 19 is provided with a stepped flange 19ª that fits in an annular recess in the top wall of the gear case and a friction reducing bearing 21, preferably a ball bearing, is interposed between said sleeve and the thrust cap 13, the outer member of said bearing fitting in the hole in the top wall 9 of the wheel carrying member that the thrust cap 13 closes and the inner member of said bearing surrounding a reduced portion at the upper end of the sleeve 19. The thrust cap 13 is provided on its underside with an annular flange 13ᵇ that projects downwardly into an annular recess in the top wall 9 of the wheel carrying member. When it is desired to fill the gear case with a lubricant the thrust cap 13, bearing 21, and sleeve 19 are removed so as to permit the lubricant to be introduced into the gear case through the opening in the top wall 6 of same in which the sleeve 19 is seated.

The sleeve 20 is provided with a non-circular-shaped head 20ª that is adapted to be engaged by a wrench to turn said sleeve so as to screw it into or out of the bottom wall 7 of the gear case, and said sleeve is provided at its lower end with a reduced portion that is surrounded by the inner member of a ball bearing 22, the outer member of said ball bearing fitting inside of the depending collar 16 on the wheel carrying member and resting upon the member 15 that is screwed into said collar.

The drive shaft sections 2 and 2ª are provided with gears, preferably beveled pinions 23 and 23ª, respectively, that are operatively connected with each other by an idler pinion 24 which is supported by a ball bearing 25 whose outer member fits in a seat in the underside of said idler and whose inner member surrounds a reduced portion at the upper end of the sleeve 20 and bears against a shoulder 20ᵇ on said sleeve. A tapered roller bearing 26 is arranged between the idler 24 and a flange 27 on the king pin F so as to take up the end thrust and eliminate the possibility of the king pin being cut by the idler, the outer member of said bearing being seated in the idler and the inner member of said bearing surrounding the portion of the king pin directly below the flange 27 on the king pin. When the pinions become worn it is only necessary to remove the adjustable member 15 and the bearing 22 supported by same and then adjust the sleeve 20 upwardly so as to raise the idler 24 sufficiently to compensate for the wear on same and on the pinions 23 and 23ª. To take up the wear on the bearings 21 and 22 on which the wheel carrying member E turns, the thrust cap 13 is held with a spanner wrench and the member 15 is screwed upwardly farther into the collar 16 on the underside of the wheel carrying member. The king pin F can be screwed downwardly to take up the wear on the bearing 26 by removing the cap nut 18 and applying a wrench to the non-circular-shaped portion 17 on the upper end of said king pin and turning said king pin in a direction to screw it downwardly. Bearings 28 and 29, preferably ball bearings, are mounted in the gear case C and in the wheel carrying member E, respectively, to support the sections 2 and 2ª of the drive shaft. A driving mechanism of the construction above described is inexpensive to manufacture, it will not wear out quickly and it is strong enough to stand up under severe operating conditions, due to the fact that the gear cases C and the wheel carrying members E consist of rugged castings constructed in such a manner that they form oil and dust-proof housings for the gears and combined with friction reducing bearings that can be adjusted easily to compensate for wear and to maintain the co-operating parts in proper co-operative relationship with each other.

Preferably, a packing ring 30 of felt or other suitable material is arranged between the underside of the gear case C and the bottom portion of the wheel carrying member that laps over same and similar packing strips are set in vertically-disposed grooves 31 in the gear case at the ends of the opening 5ª in the front side of said gear case so as to prevent the entrance of dirt or the escape of oil from the gear case.

Instead of connecting the drag link (not shown) of the steering mechanism to an arm 32 on one of the wheel carrying members, as is the usual practice in structures of this character, I prefer to connect the drag link to one arm 33 of a double armed lever on the axle housing A, as shown in Figure 1 and pivotally connect the other arm 34 of said lever to a link 35 whose opposite end is pivotally connected to an angularly-disposed extension 36 on the arm 32 on the wheel carrying member, as I have found that such a construction tends to prevent the front wheels from wobbling when they encounter ruts or obstructions in the road.

Having thus described my invention, what I claim as new and desire to secure by Letters Patent is:

1. A driving mechanism for vehicles, comprising an axle housing provided at one end with a gear case, an oscillating wheel carrying member having portions that embrace parts of said gear case, a king pin consisting of a one piece spindle that extends vertically through said gear case and wheel carrying member, a thrust cap resting upon the top wall of said wheel carrying member and connected by screw threads to said king pin, a threaded member adjustably mounted in the underside of said wheel carrying member and connected to said king pin by screw threads, and friction reducing bearings arranged in concentric relation with said king pin and interposed between the gear case and said thrust cap and adjustably mounted member.

2. A driving mechanism for vehicles, comprising an axle housing provided at one end with a gear case, an oscillating wheel carrying member having portions that embrace parts of said gear case, a king pin consisting of a bolt that extends vertically through said gear case and wheel carrying member, a thrust cap resting upon the top wall of said wheel carrying member and connected by screw threads to said king pin, a threaded member adjustably mounted in the underside of said wheel carrying member and connected to said king pin by screw threads, friction reducing bearings arranged in concentric relation with said king pin and interposed between the gear case and said thrust cap and adjustably mounted member, drive shaft sections journaled in said gear case and wheel carrying member and provided with beveled pinions, an idler interposed between said pinions, a friction reducing bearing on which said idler turns, and an adjustable part in the gear case which when turned in one direction causes said idler to be moved towards said pinions so as to take up the wear on said pinions and idler.

3. A driving mechanism for vehicles, comprising an axle housing provided at one end with a gear case, an oscillating wheel carrying member having portions that embrace parts of said gear case, a king pin consisting of a bolt that extends vertically through said gear case and wheel carrying member, a thrust cap resting upon the top wall of said wheel carrying member and connected by screw threads to said king pin, a threaded member adjustably mounted in the underside of said wheel carrying member and connected to said king pin by screw threads, friction reducing bearings arranged in concentric relation with said king pin and interposed between the gear case and said thrust cap and adjustably mounted member, drive shaft sections journaled in said gear case and wheel carrying member and provided with beveled pinions, an idler interposed between said pinions, a friction reducing bearing on which said idler turns, an adjustable part in the gear case which when turned in one direction causes said idler to be moved towards said pinions so as to take up the wear on said pinions and idler, a friction reducing bearing interposed between said idler and a flange on said king pin, and means on said king pin to which a wrench can be applied so as to move said king pin in a direction to compensate for wear on the bearing interposed between the idler and the flange on said king pin.

4. A driving mechanism for vehicles, comprising an axle housing provided at one end of a gear case formed by a rugged casting having top and bottom walls spaced away from each other, an oscillating wheel carrying member formed by a rugged casting having top and bottom walls that embrace the corresponding walls of the gear case, a vertically-disposed king pin consisting of a one-piece spindle, a removable sleeve in the top wall of the gear case and an adjustable sleeve in the bottom wall of the gear case through which said king pin passes, a thrust cap resting on the top wall of the wheel carrying member and having an internally screw-threaded hole through which a threaded portion of the king pin passes, an integral, internally screw-threaded collar on the bottom wall of the wheel carrying member, a vertically-adjustable member in said collar having an internally screw-threaded hole through which a threaded portion of the king pin passes, friction reducing bearings interposed between the removable sleeve and the thrust cap and between the adjustable sleeve and said vertically adjustable member, drive shaft sections journaled in the gear case and in the wheel carrying member and provided with beveled pinions, an idler surrounding the king pin and arranged in mesh with said pinions, a friction reducing bearing for said idler sustained by the adjustable sleeve in the gear case, and a tapered roller bearing interposed between said idler and a flange on said king pin.

5. A driving mechanism for vehicles, comprising a gear case, an oscillating wheel carrying member having portions that embrace said gear case, a vertically-disposed king pin in said gear case and wheel carrying member consisting of a bolt, drive shaft sections journaled in said gear case and wheel carrying member and provided with beveled pinions, an idler arranged in concentric relation with said king pin and in mesh with said pinions, friction reducing bearings interposed between said gear case and wheel carrying member, a friction reducing bearing on which said idler turns, an end thrust friction reducing bearing interposed between said king pin and said idler, and means for enabling said various bearings to be adjusted to compensate for wear.

6. A driving mechanism for vehicles, comprising an axle housing, oscillating wheel carrying members arranged at the ends of said axle housing, drive shaft sections journaled in the gear cases and in the wheel carrying members and connected together by gears, a double-armed lever pivotally mounted on the axle housing and provided with a rearwardly-projecting portion and also an integral drag link portion that projects rearwardly and laterally, a rigid arm projecting rearwardly from one of said wheel carrying members and provided with an extension, and a link pivotally connected to said extension and to the rearwardly-projecting portion of said double-armed lever.

CLIFFORD H. YOUNG.